United States Patent [19]

Dobberpuhl

[11] 4,289,224
[45] Sep. 15, 1981

[54] INDEPENDENT WHEEL DRIVE

[75] Inventor: Dale R. Dobberpuhl, Horicon, Wis.

[73] Assignee: Deere & Company, Moline, Ill.

[21] Appl. No.: 72,272

[22] Filed: Sep. 4, 1979

[51] Int. Cl.³ .................. F16D 41/16; B60K 23/06
[52] U.S. Cl. .................................. 192/50; 74/650; 180/76; 192/35
[58] Field of Search ............... 192/35, 36, 50; 74/650; 180/76

[56] References Cited

U.S. PATENT DOCUMENTS

| | | | |
|---|---|---|---|
| 672,784 | 4/1901 | Kramer | 74/650 |
| 1,071,863 | 9/1913 | Beguhn | 74/650 |
| 1,262,562 | 4/1918 | Reiche | 74/650 |
| 1,371,361 | 3/1921 | Gaston | 74/650 |
| 1,437,453 | 12/1922 | Sheckler | 74/650 |
| 2,784,820 | 3/1957 | Clark | 192/50 X |
| 3,463,280 | 8/1969 | Hoffman et al. | 192/35 X |

*Primary Examiner*—Allan D. Herrmann

[57] ABSTRACT

A vehicle drive system particularly suited for snow blowers includes a main sprocket rotatably carrying a first and second pawl. Each pawl drivably engages a respective sprocket. The first sprocket is fixably mounted to a first axle means such that rotation of the main sprocket causes the first pawl to drivably engage the first sprocket to rotate the first axle means. A second sprocket is fixably engaged to a second axle means such that rotation of said main sprocket causes a second pawl to drivably engage the second sprocket to cause rotation of the second axle means. Friction means supplies sufficient drag to the pawl such that rotation of main sprocket causes each of the pawls to assume an engaging orientation with their respective sprockets. Each of the pawls can be selectively disengaged from a drive orientation by manually advancing the respective axle means, i.e., when an operator maneuvers the vehicle for turning.

2 Claims, 5 Drawing Figures

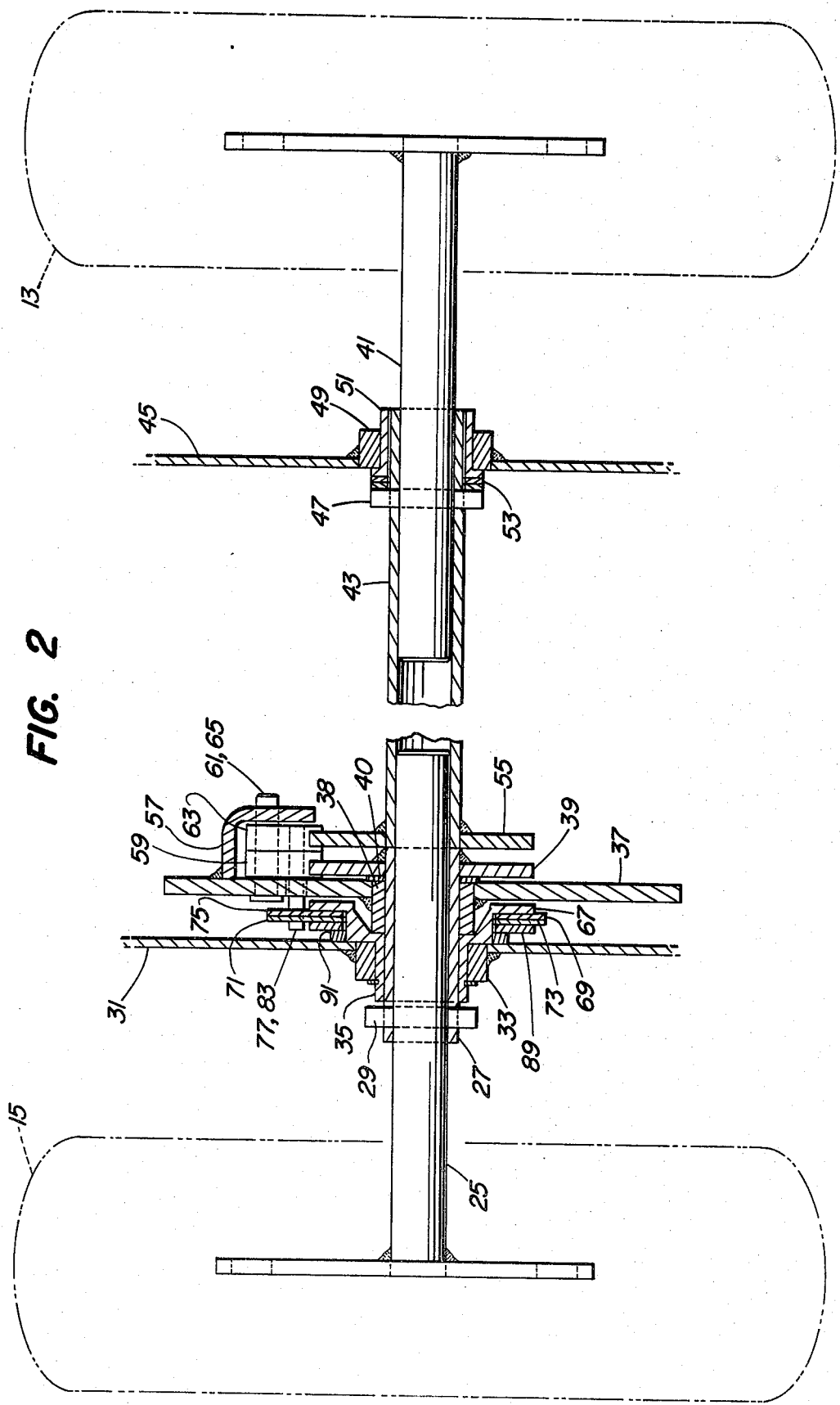

INDEPENDENT WHEEL DRIVE

This invention relates to vehicle drive systems and, more particularly, to vehicle drive systems for light vehicles such as lawn mowers, sweeping brushes, and snow blowers.

Some light vehicles such as a snow blower, utilize a conventional adjustable differential communicating with axle drive to drive the vehicle. The differential action permits easy turning of the machine i.e., either wheel can be freed to turn independently of one another. On icy surfaces, the wheels can be locked together by turning an adjustable friction pad to allow better traction of the machine. However, with both wheels locked on an icy surface, an operator must slide one wheel in order to turn the machine.

The present invention when employed on light vehicles such as a snow blower retains the easy turn characteristics of a conventional differential on dry surfaces and promotes easy turn characteristics on icy surfaces without external differential adjustment.

SUMMARY OF THE INVENTION

A vehicle drive system particularly suited for light vehicles such as sweeping brushes, lawn mowers, and snow blowers includes a main sprocket in driven communication with the vehicle engine rotatably carrying a plurality of pawls. A first sprocket is fixably mounted to a first axle means, and positioned thereon to permit driving engagement between a first pawl and the first sprocket. A second sprocket is fixably mounted to a second axle means and positioned thereon to permit driving engagement between a second pawl and the second sprocket. The first and second axle means are linearly aligned and positioned to drive a vehicle.

Friction means are provided to supply sufficient drag to the first and second pawls such that the pawls can rotate with respect to the main sprocket to assume an engaging orientation to their respective sprockets when the main sprocket is rotated. Each of said pawls can be selectively disengaged from a drive or engaging orientation by manually advancing the respective axle means which redirects the influence of the friction means on the particular pawl to cause the affected pawl to assume a disengaging orientation, thereby enabling an operator to turn the carrying vehicle with relative ease.

It is an object of the present invention to provide a drive mean for vehicles, such as lawn mowers and snow blowers which provides a positive driving force, i.e., each drive wheel imparts motion to the carrying vehicle, and to facilitate easy turning of said vehicle on dry or icy surfaces.

BRIEF DESCRIPTION OF THE DRAWINGS

FIG. 2 is a fragmented elevated view of the snow blower drive system.

DESCRIPTION OF THE PREFERRED EMBODIMENT

Figure 1:
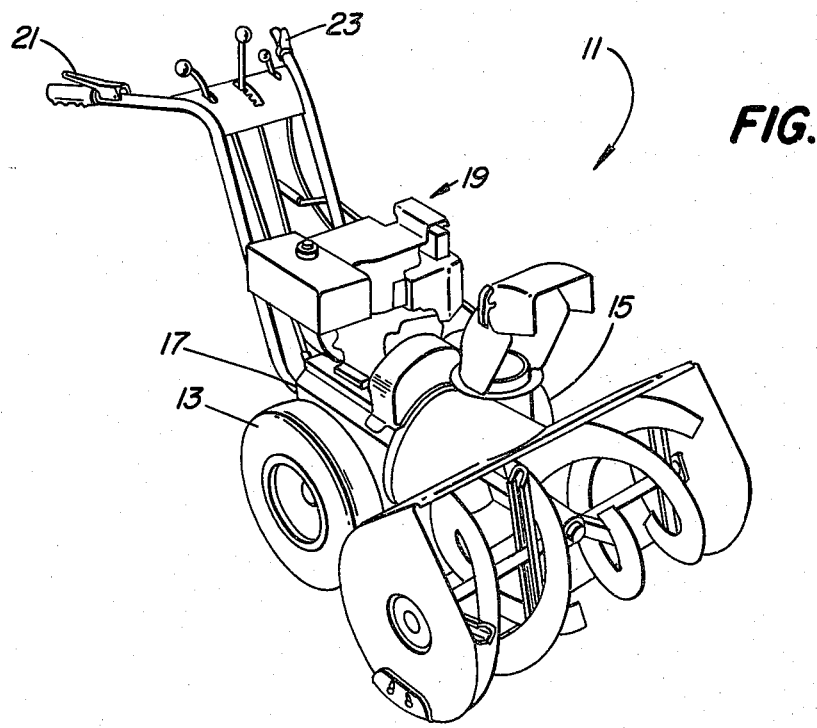
FIG. 1 is a perspective view of a snow blower.

Referring to FIG. 1, a light vehicle in the specie of a snow blower, generally indicated as 11, has a right wheel 13 and a left wheel 15 mounted to a frame 17 carrying an engine 19. The snow blower 11 is guided by an operator whose action upon handles 21 and 23 determines the direction advanced by the snow blower 11.

Referring to FIG. 2, the drive system includes a left wheel 15 fixably mounted to an axle 25 by any conventional means. A first tube member 27 is placed around a portion of axle 25 and held there by a pin 29 which passing through axle 25 and tube member 27. The axle 25 and tube member 27 extend through the frame wall 31 of frame 17. A mounting ring 33 is fixably mounted to frame wall 31 by any conventional means such as welding through which axle 25 and tube member 27 extend. A support ring 35 of suitable material is placed between mounting ring 33 and tube member 27 to rotatably maintain tube member 27. A main sprocket 37 is fixably mounted by any conventional means such as welding to a flotation ring 38 placed around a portion of tube member 27 to permit rotation of main sprocket 37 around tube member 27. Main sprocket 37 is chain driven (not shown) by motor 19. Fixably mounted by any coventional means such as welding, to the tubular member 27 is a first drive sprocket 39. A spacer ring 40 is placed between drive sprocket 39 and flotation ring 38 around tube member 27.

The right wheel 15 is fixably mounted by conventional means to an axle 41. Axle 41 partially extends into a second tubular member 43. Axle 41 and tube member 43 extend through the right frame wall 45 colinear to axle 25 and containing a portion of axle 25 therein. A retainer pin 47 is passed through axle 41 and tube member 43. A spacing ring 53 is placed between pin 47 and a support ring 51 which rotatably maintains axle 41 and tube member 43 in frame wall 45. A mounting ring 49 is fixably mounted to frame wall 45 through which axle 41 and tube member 43 extend a maintaining support ring 51 is fixably maintained. Fixably mounted to the second tubular member 43 is a second drive sprocket 55.

Figure 3:
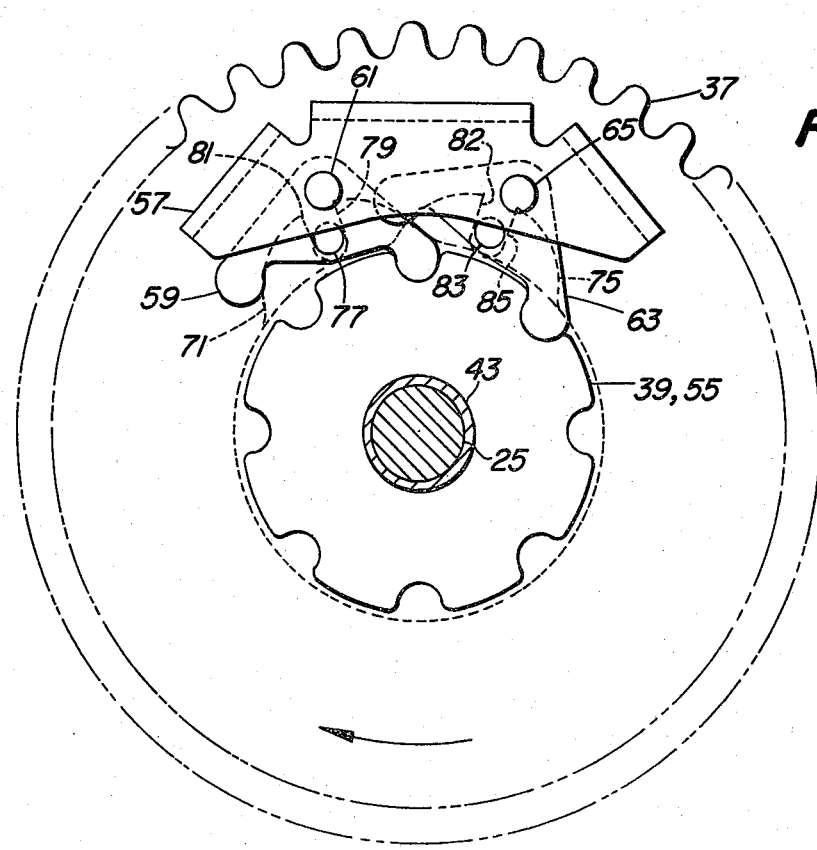
FIG. 3 is a side view of the axle drive means.
Figure 4:
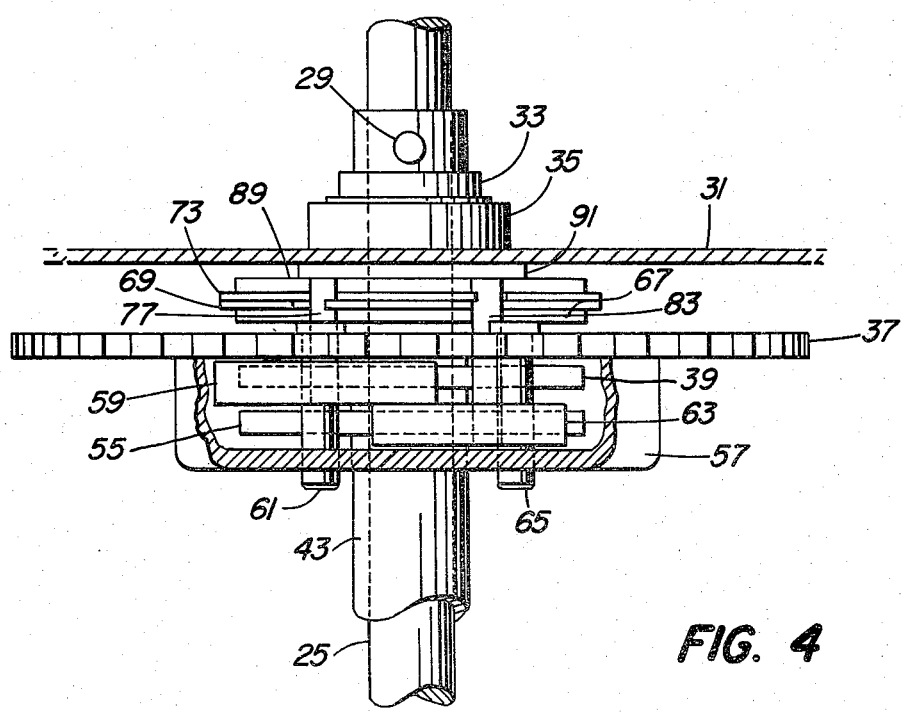
FIG. 4 is a top view of the axle drive means.

Referring to FIGS. 2, 3, and 4, the main sprocket 37 carries fixably mounted thereto a partial enclosure 57. Rotatably mounted within the enclosure 57 and extending vertically beyond the enclosure opening is a first and second pawls 59 and 63, respectively. A pin 61 passing through the main sprocket 37 to the first pawl 59 and a second pin 65 passing through sprocket 37 to the second pawl 64 to rotatably maintain the pawls 59 and 63. The first and second pawls 59 and 63 being horizontally offset with respect to each other. Pawls 59 and 63 aligned to engage respective sprockets 39 or 55. Rotatably mounted around mounting ring 35 is a first and second friction disk 69 and 73 held in position by surface 67 of mounting ring 35. A second ring 89 sandwiches the friction pads 69 and 73 therebetween a ring 89 and surface 67 of ring 35. A compression element 91 is placed between wall 31 and ring 89 to maintain horizontal compression on the friction pads.

The first and second friction pads 69 and 73 have a surface portion 71 and 75 respectively. Surface 71 has a groove 81 therein through which a pin 77 extends through the groove 81 and through an enlarged opening 81 in sprocket 87 from the first pawl 59 whereto pin 77 is fixably mounted by any conventional means. A second pin 83 extends through a groove 82 on the second friction surface 75 to an enlarged opening 85 in the second pawl 63. It is observed that rotation of the main sprocket 37 causes the friction pad to place the drag upon each pin 77 and 83 causing the pawls 59 and 63 to rotate about pins 61 and 65 respectively. The rotation of pawls 59 and 63 causing them to assume a driving engagement with the aligned driven sprockets 55 and 37, respectively.

Figure 5:
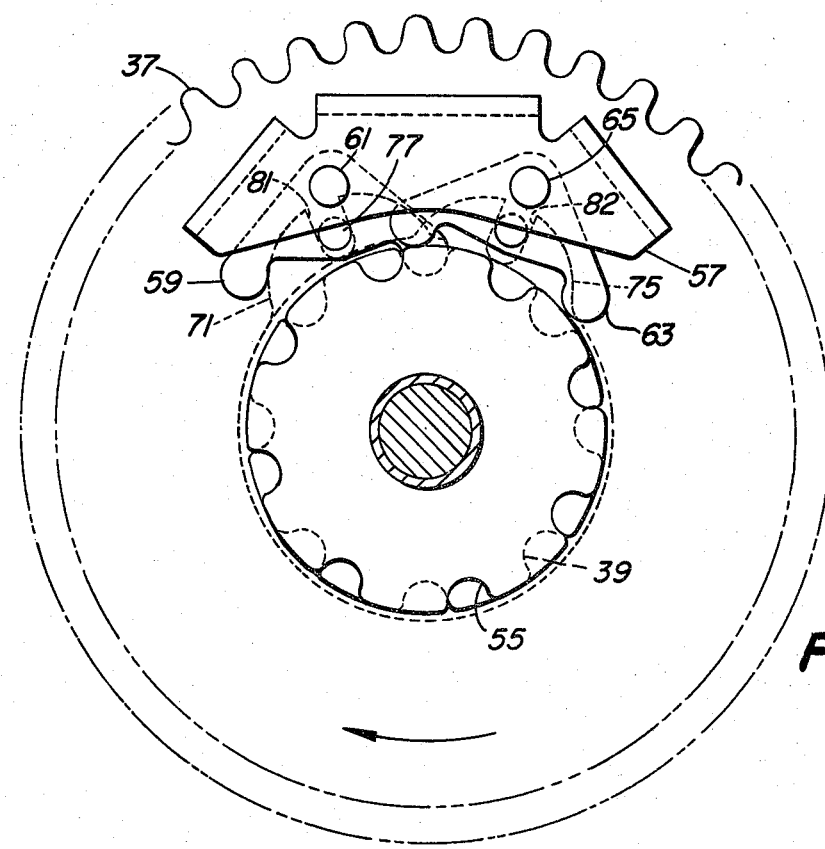
FIG. 5 is a frontal view of the axle drive means when the snow blower is being turned to the left.

Referring to FIG. 5, it is observed that when making a left turn operator advancement of the right wheel 13 causes the second pawl 63 to advance out of the second drive sprocket 55 allowing the right wheel 13 to free-wheel around facilitating a left turn, main sprocket being rotated in a clockwise direction.

I claim:

1. A drive system mounted to a vehicle, said drive system in communication with the vehicle power unit, comprising:
   (a) a first axle rotatably mounted to said vehicle;
   (b) a second axle rotatably mounted to said vehicle;
   (c) a first sprocket fixably mounted around a portion of said first axle;
   (d) a second sprocket fixably mounted around a portion of said second axle;
   (e) a main sprocket rotatably mounted around a portion of one of said axles, said main sprocket in communication with said vehicle power unit such that said vehicle power unit can cause said main sprocket to rotate, said first, second, and main sprocket being mounted generally parallel to each other;
   (f) a first pawl rotatably mounted to said main sprocket and positioned to enable a driving engagement with said first sprocket;
   (g) a second pawl rotatably mounted to said main sprocket and positioned to enable a driving engagement with such second sprocket;
   (h) a first friction disk;
   (i) a second friction disk placed beside said first friction disk;
   (j) a ring having retaining wall and fixably mounted around one of said axles, said first and second friction disk rotatably mounted around said ring, one of said disk to abut said retaining wall;
   (k) a compressing means for pressing said disk against each other and said retaining wall;
   (l) a first pin fixably mounted to said first pawl, said pin to extend through said first enlarged opening in said main sprocket and entering an opening in said first friction disk, such that said first pin can cause said first pawl to rotate;
   (m) a second pin fixably mounted to said second pawl, said pin to extend through a second enlarged opening in said main sprocket and entering an opening in said second friction disk, such that said second pin can cause said second pawl to rotate;
   whereby rotation at said main sprocket causes first and second pins in cooperation with said first and second friction disk to rotate said first and second pawls sufficient to engage the respective first and second sprockets, by advancing one of said axles relative to said other axle said advanced axle is allowed to free-wheel by revising the influence of hard friction disk to cause disengagement of said pawl.

2. A drive system mounted on a vehicle, said drive system in communication with the vehicle power unit, comprising:
   (a) first axle rotatably mounted to said vehicle;
   (b) a second axle rotatably mounted to said vehicle;
   (c) a first sprocket fixably mounted around a portion of said first axle;
   (d) a second sprocket fixably mounted around a said portion of said axle;
   (e) a main sprocket rotatably mounted around a portion of one of said axles, said main sprocket in communication with said vehicle power unit except that said power unit can cause the main sprocket to rotate, said first and second sprockets and said main sprocket being mounted generally parallel to each other;
   (f) a first pawl rotatably mounted to said main sprocket and positioned to enable a driving engagement with said first sprocket;
   (g) a second pawl rotatably mounted to said main sprocket and positioned to enable a driving engagement with said second sprocket;
   (h) a first friction disk;
   (i) a second friction disk;
   (j) means for maintaining first and second disks parallel to and in contact with each other, said means to compress said first and second disks to allow said first and second disks to rotate with respect to one another;
   (k) a first pin fixably mounted to said first pawl, said pin to extend through a first enlarged opening in said main sprocket and enter into an opening in said friction disk, such that said first pin can cause the first pawl to rotate;
   (l) a second pin fixably mounted to said second pawl, said second pin to extend through a second enlarged opening in said friction disk such that said second opening can cause said pawl to rotate;
   whereby, rotation of said main sprocket causes said first and second pins in cooperation with said first and said friction disks to rotate said first and second pawls sufficiently to engage the respective first and second sprockets by advancing one of said axes relative to said other axle, said advance axle is allowed to free-wheel.

* * * * *